3,053,911
NEW METHOD FOR THE PREPARATION OF METAL-HALOGENO-ACETYLIDES
Heinz Gunter Viehe, Brussels, Belgium, assignor to Union Carbide Corporation, a corporation of New York
No Drawing. Filed June 25, 1959, Ser. No. 822,722
10 Claims. 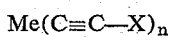 (Cl. 260—665)

This invention relates to a new method for the preparation of metal-halogeno-acetylides. More particularly, it relates to a method for the preparation of lithium-halogeno-acetylides.

In my copending application 774,818, filed November 19, 1958, I disclosed novel metal-halogeno-acetylides which can be represented by the general formula:

$$Me(C \equiv C-X)_n$$

wherein Me is a metal which normally forms unsubstituted or mono-substituted acetylides, —C≡C— is an acetylenic group, X is a halogen and $n$ is a number indicating the proportion in which —(C≡C—X) is combined with the metal. These novel compounds have utility as intermediates for reactions of substitution with halogeno substituted alkyls or aryls. They can also be used in exchange reactions and as blocking groups, and the like. Finally, these compounds and particularly lithium-chloro-acetylide have extremely good explosive properties.

Two methods for preparing these novel acetylides were also disclosed in my copending application. These methods were: (1) an exchange reaction between an organo-lithium and dichloroacetylene, and; (2) the reaction between a metal amide and a dihalogeno-ethylene in liquid ammonia.

These methods, however, have not proved completely satisfactory. The reaction between a metal amide and a dihalogeno ethylene is successful only when such reaction is performed in a liquid ammonia medium at a low temperature. However, when the desired metal-halogeno-acetylide is to be prepared in an organic solvent, only the first method, i.e., the exchange reaction, can be employed. Even this method, however, is restricted in its use because dichloro acetylene is a dangerous, explosive compound.

It is the object of this invention, therefore, to provide a new and improved process for the preparation of a metal-halogeno-acetylide in an organic solvent which will avoid the aforedescribed difficulties and more particularly will provide a new and improved process for the formation of a lithium-halogeno-acetylide.

The object of this invention is accomplished by reacting a dihalogeno-ethylene with an organo-lithium in a solution inert to organo-metallics, at a temperature of from about —60° C. to room temperature.

The above reaction may be illustrated by the following equation:

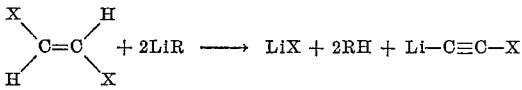

wherein R represents an alkyl or aryl group and X represents a halogen atom.

As aforementioned, the subject reaction is carried out in a solution which will not react with organo-metallics i.e. ethers, petroleum ethers and the like. Among those solutions especially preferred are diethyl ether, methyl ethyl ether, dioxane, tetrahydrofuran, or those solvents currently available and known to be of general use in reactions involving organometallic agents.

Among those organo-lithium reactants especially preferred in the process of my invention are methyl-lithium, butyl-lithium or phenyl-lithium. In this regard, methyl-lithium is particularly preferred. While any dihalogeno-ethylene will work in the process of this reaction, I have found it preferable to employ dichloroethylene since this compound enters into the reaction with the greatest facility. In this connection, any of the three isomers of dichloroethylene can successfully be used in the subject reaction, i.e. either cis-, trans- or dichloro-vinylidene.

I have found it preferable to employ stoichiometric amounts of the reactants in the process of my invention, e.g. two molecular equivalents of the organo-lithium per one molecular equivalent of dichloroethylene. As aforementioned, the subject reaction should be carried out at a temperature of between —60° C. and room. I have found it preferable, however, to conduct the subject reaction at a temperature of about 0° C. A relatively higher temperature (i.e. above room temperature) affects the formation of the mono-chloroacetylene intermediate and thus decreases the yield in the desired final product. It should be noted that the mechanism of the subject invention probably always leads to the production of the mono-intermediate. The reaction conditions of my process, however, are such that the intermediate continues to react with the organo-lithium thereby forming the desired Li—C≡C—X.

In the practice of my invention, it is advisable to continually stir the reaction mixture and to avoid the introduction of water or humidity therein. The introduction of water or humidity is detrimental since it leads to the hydrolysis of the reaction product.

My reaction is of special value in preparing in situ the highly reactive Li—C≡C—Cl. In this regard, the preferred reaction involves reacting two molecular equivalents of methyl-lithium with one molecular equivalent of dichloro-ethylene in an ethereal solution at a temperature of about 0° C.

In addition to the previously mentioned advantage for my process, i.e. easy preparation of the derived compound in an organic solvent, I have found that my process offers at least two advantages, i.e. no necessity of working at a very low temperature as in the preparation of the acetylide using a metal amide, and the avoidance of employing a relatively dangerous reactant such as dichloroacetylene. Moreover, the reactants of the subject invention are more commercially available and considerably less expensive than those previously employed.

The following examples are illustrative of the practice of this invention.

*Example 1*

200 cc. of methyllithium solution (1.89 N) in 200 cc. of ether, 18.5 grams of trans-dichloroethylene in 50 cc. of ether were mixed at 0° C. and stirred for about one hour in a three necked bottle. The reaction mixture was then held at room temperature for about 1½ hours before the dropwise addition of 18.7 grams of cyclohexanone in 50 cc. of ether, the reaction mixture being maintained under gentle reflux. The reaction mixture was then cooled at —60° C. and 20 cc. of saturated ammonium chloride solution was added to the reaction mixture. This decomposed the alcoholate formed. The ethereal phase was washed with 2 N HCl and water and dried over sodium sulfate. Ether was eliminated by distillation and the residue distilled under reduced pressure (at 10 mm. Hg). The second fraction, collected at 94–98° C. (at 10 mm. Hg) consisted of 1,1-chloroethyne cyclohexanol. The yield in final product, calculated as corresponding to the intermediate lithium-chloro-acetylide formed in situ, was 82%.

The addition of a stoichiometric amount of cyclohexanone to the reaction mixture of methyllithium and trans-dichloroethylene in an ethereal solution, whereby 1,1-chloroethyne cyclohexanol was formed, confirmed the production of lithium-chloro-acetylide.

Example II

Following the procedure of Example I, except that 100 cc. of n-butyl-lithium solution (1.29 N) in 150 cc. absolute ether and 6.26 gr. of cis-dichloroethylene were used in place of methyllithium and trans-1,2-dichloroethylene. The compound Li—C≡C—Cl was formed. This was confirmed by the addition of 6.3 grams of cyclohexanone in 30 cc. of ether whereby a 30% yield of 1,1-chloroethyne-cyclohexanol was obtained.

Example III

Following the same procedure and same quantities as in Example II except that trans 1,2-dichloroethylene was employed in place of the cis-isomer, a 30% reaction yield was obtained.

Example IV

Following the same procedure as in Example I, except that 100 cc. of phenyl lithium solution (1.0 N) in 120 cc. of ether and 4.85 grams of trans-dichloroethylene in 50 cc. of ether were used, it was confirmed that, following the addition of 4.9 grams of cyclohexanone in 50 cc. of ether a yield of 80% of lithium-chloro-acetylide was obtained.

Example V

To 150 cc. of methyl lithium solution (2.2 N) in 100 cc. of ether, 16 grams of dichlorovinylidene in 50 cc. of ether was added at room temperature under stirring. The reaction mixture was then maintained under reflux for 1½ hours before 16.2 grams of cyclohexanone in 50 cc. of ether was added thereto.

Following, thereafter, the procedure outlined in Example I, it was found that a yield of 51% 1,1-chloroethyne cyclohexanol was obtained, which corresponded to the yield of the intermediate lithium-chloro-acetylide obtained in situ by the reaction of the methyl lithium and the dichlorovinylidene.

What is claimed is:

1. A process for the preparation of a lithium-halogeno-acetylide which comprises reacting a dihalogeno-ethylene with an organo-lithium in an organic solvent inert to organo-metallics.

2. A process for the preparation of a lithium-halogeno-acetylide which comprises reacting a stoichiometric amount of a dihalogeno-ethylene with a stoichiometric amount of an organo-lithium in an ethereal solution at a temperature of between −60° C. and room temperature.

3. A process as claimed in claim 2 in which the organo-lithium is a member selected from the group consisting of methyl, butyl and phenyl lithium.

4. A process as claimed in claim 2, in which the dihalogeno-ethylene is a member selected from the group consisting of cis- and trans-dichloro-ethylene and dichlorovinylidene.

5. A process as claimed in claim 2, in which the ethereal solution is a member selected from the group consisting of diethyl ether, methyl ethyl ether, dioxane and tetrahydrofuran.

6. A process as claimed in claim 2, in which the reaction is carried out with stirring and under anhydrous conditions.

7. A process as claimed in claim 2, in which the reaction is carried out at a temperature of about 0° C.

8. A process for the preparation of lithium-chloro-acetylide which comprises reacting stoichiometric amounts of an organo-lithium with a dichloro-ethylene in an ethereal solution at a temperature of between −60° C. and room temperature.

9. A process for the preparation of lithium-chloro-acetylide which comprises reacting stoichiometric amounts of methyl lithium with a dichloro-ethylene in an ethereal solution at 0° C.

10. A process for the preparation of lithium-chloro-acetylide which comprises reacting stoichiometric amounts of a member selected from the group consisting of butyl and phenyl lithium with a dichloro-ethylene in an ethereal solution at 0° C.

References Cited in the file of this patent

UNITED STATES PATENTS 2,623,077   Croxall et al. _____ Dec. 23, 1952

OTHER REFERENCES

Cristol et al., Journal of the American Chemical Society, volume 77 (1955), pages 5034–5038 relied on.